United States Patent [19]
Fah

[11] Patent Number: 5,671,562
[45] Date of Patent: Sep. 30, 1997

[54] LIQUID LEVEL CONTROL DEVICE

[76] Inventor: Ah N. Fah, 12/176 Canterbury Rd., Bayswater, 3153 Victoria, Australia

[21] Appl. No.: 387,838
[22] PCT Filed: Aug. 18, 1993
[86] PCT No.: PCT/AU93/00422
 § 371 Date: Apr. 21, 1995
 § 102(e) Date: Apr. 21, 1995
[87] PCT Pub. No.: WO94/04971
 PCT Pub. Date: Mar. 3, 1994

[30] Foreign Application Priority Data

Aug. 19, 1992 [AU] Australia ................... PL4162
Aug. 19, 1992 [AU] Australia ................... 21106/92

[51] Int. Cl.⁶ ................................................. A01G 31/02
[52] U.S. Cl. .................................... 47/79; 47/48.5
[58] Field of Search ........................ 47/79 C, 79 V, 47/48.5 CR, 48.5 R, 79 R

[56] References Cited

U.S. PATENT DOCUMENTS 2,818,877  1/1958  Swanson ................. 47/48.5 CR
4,557,071  12/1985  Fah ........................... 47/79 C
4,581,848  4/1986  Kröber ..................... 47/79 C
5,090,443  2/1992  Jacobsen ................. 47/79 C

*Primary Examiner*—Dave W. Arola
*Assistant Examiner*—Joanne C. Downs
*Attorney, Agent, or Firm*—Townsend and Townsend and Crew LLP

[57] ABSTRACT

A liquid level control device adapted to be located in a vessel comprising a first flow controller (21) having a float (39) located in a chamber (53) which controls a valve (33), the chamber being open at the bottom to allow water ingress and egress and having an air vent (32) and a breather (52), and a second flow controller (22) having a float (69) which controls a valve (63) which is connected to the air vent (32). The first flow controller (21) controls water ingress to the vessel and the second flow controller (22) controls flow of air to the first chamber (53). Both flow controllers (21, 22) work together to maintain a constant level of liquid in the vessel. This liquid level control device is used for automatic watering of plants.

10 Claims, 8 Drawing Sheets

LIQUID LEVEL CONTROL DEVICE

FIELD OF THE INVENTION

This invention relates to a liquid level control device.

BACKGROUND TO THE INVENTION

Reference is made to my co-pending patent application Ser. No. PL4162/92 and the whole subject matter of the specification thereof is to be considered to be imported hereinto.

SUMMARY OF THE INVENTION

The present invention provides a liquid level control device adapted to be located in a vessel, the device comprising a first flow controller comprising a first float located in a first chamber, a first chamber being open at its bottom to allow water ingress and egress and having a first vent to allow egress of air, and a first valve associated with the first float such that, in use, when the float is at a down position when the level of water in the chamber is at or below a first predetermined level, the first valve will open to allow water into the vessel and into the first chamber, to tend to raise the first float and to displace air in the first chamber via the first vent, and such that, in use, when the first float is at an up position when the level of water in the first chamber is at or above a second predetermined level, the first valve will close to prevent further water flow into the vessel;

a second flow controller comprising a second float, and a second valve associated with the second float and connected to the first vent such that, in use, when the second float rises, in consequence of the first valve allowing water into the vessel, the second valve will open to allow air to flow from the first chamber via the first vent and the second valve to escape to atmosphere, and constructed and arranged such that when the water level in the vessel drops to a third predetermined level in consequence of water in the vessel being used or being removed, the second float will fall to a level to close the second valve, before the first float has fallen to a level to open the first valve, to thereby prevent air flow via the first vent into the first chamber to establish, as the water level in the vessel falls still further, a partial vacuum in the first chamber which will maintain the water level therein at a level such that the first float will not fall to a level to open the first valve; and a breather for the first chamber located such as, in use, when the water level in the vessel falls to below a fourth predetermined level in consequence of water in the vessel being used or being removed, to allow air to enter into the first chamber to overcome the partial vacuum to allow water to flow out of the first chamber to allow the first float to fall to a level to open the first valve to commence again, in use, allowing water into the vessel.

PREFERRED FEATURES OF THE INVENTION

Preferably the second float is located in a second chamber. For reasons of economy, the second chamber is preferably substantially identical to the first chamber.

Preferably the first chamber and the second chamber have mounting means adapting them to be mounted together as a unit.

Preferably the mounting means is such that the first chamber and the second chamber may be mounted together as a unit with one of the first chamber and the second chamber being located at a selected height with respect to the other of the first chamber and the second chamber.

Preferably the first chamber and the second chamber are each defined by a casing having a side wall, a top wall and a bottom wall.

Preferably the breather comprises a tube extending from adjacent the bottom of the first chamber to adjacent to the top of the first chamber and opening to the first chamber adjacent the top of the first chamber.

The height of the bottom on the breather above the bottom of the vessel can be selected and if close to the bottom then refilling will not occur until almost all the water is used. However, the further above the bottom of the vessel the greater will be the minimum height of water in the vessel.

The cross-section area in plan of the breather will affect the rapidity of recommencing filling and we currently prefer an area of from 6 to 20 square millimeters.

In considering the breather, regard should be had to surface tension effects which can be of assistance and a hindrance. Various plastics which might be used show more and less surface tension effect.

In a preferred aspect, the present invention provides:

A liquid level control device comprising a first flow controller, and a second flow controller;

each flow controller comprising a casing having a vent at or adjacent the top, an opening adjacent the bottom, a valve having an inlet and an outlet, a float, and a fulcrum on which the float can move to control the valve;

wherein the fulcrum of the first controller is located such that in down and up positions of the float, thereof, the valve thereof is respectively open and closed and the fulcrum of the second controller is located such that in down and up positions of the float thereof the valve thereof is respectively closed and open;

wherein the casing each being at least substantially identical to one another and are adapted to be joined together as a unit and optionally at a selected height with respect to one another;

and the casing of the first controller having a breather at or adjacent to the bottom;

and constructed and arranged such that, in use, with the vent of the first controller connected to the inlet of the valve of the second controller, the inlet of the first valve connected to a water supply and the vent of the second controller open and with the device in a vessel then, when water initially commences to flow it will flow into the vessel from the outlet of the valve of the first controller to raise the float of the second controller to open the valve thereof to allow air to flow from the casing of the first controller to allow the float thereof to rise to close the valve thereof to stop water flow, when the water level in the vessel falls the float of the second controller will fall to close the valve thereof to hold water in the first casing to prevent the float thereof falling to the down position, and, when the water level in the vessel falls to a level to uncover the bottom of the breather, to allow air to flow via the breather into the casing of the first controller to allow the float thereof to fall to the down position to recommence flow into the vessel.

A specific embodiment of a liquid level control device in accordance with this invention will now be described with the aid of the accompanying drawings in which

INTEGER LIST

Figure 1:
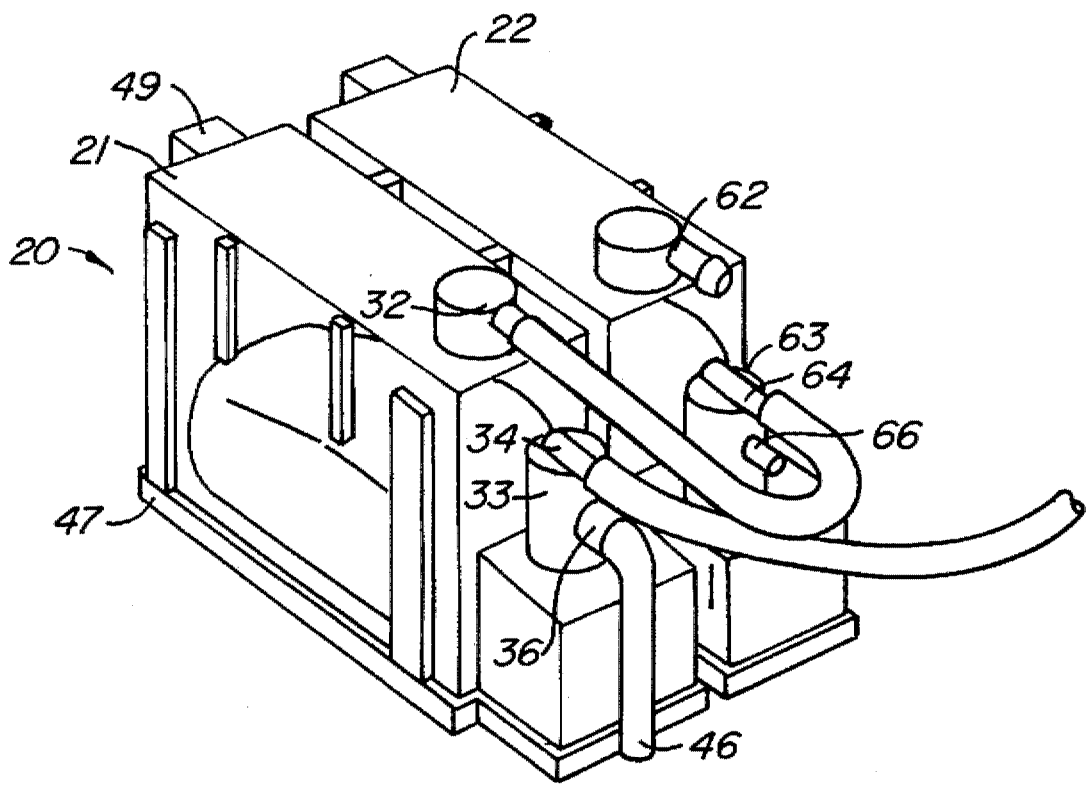
FIG. 1 is a perspective view from above and to one side of part of a liquid level control device in accordance with this invention.
Figure 2:
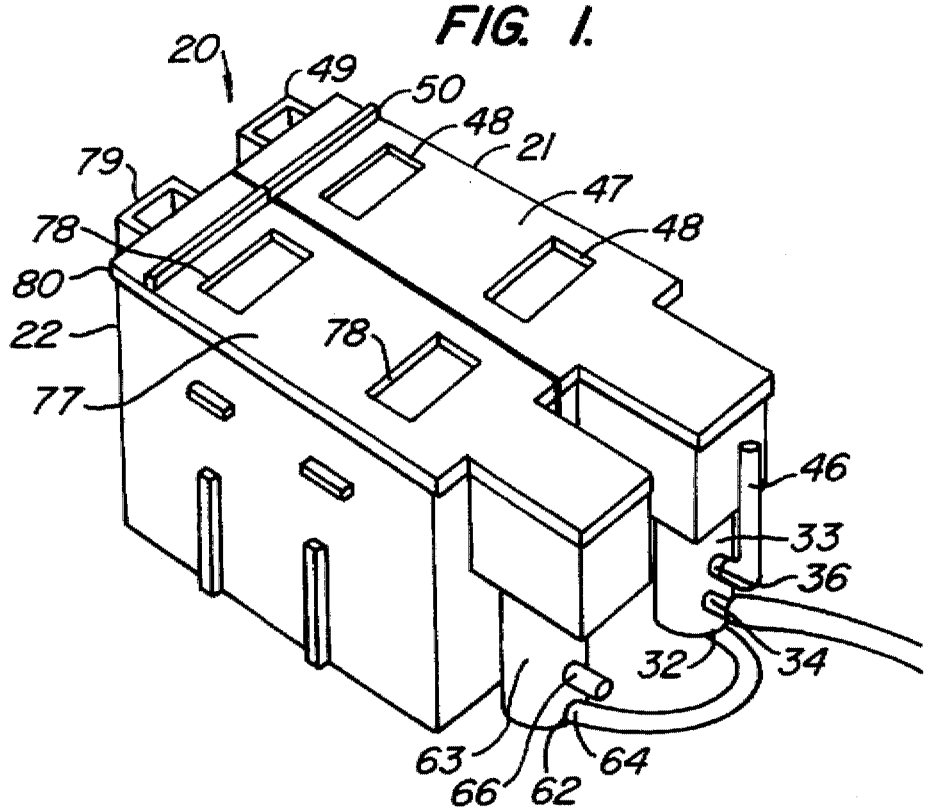
FIG. 2 is a perspective view from below and to an opposite side of another part of the device in accordance with this invention.

1. Twin wall container
2. Liquid level control device
3. Maximum water level
4. Filling hole
5. Reservoir
6. Standard pot
7. Plant
8. Cavity
9. Recess
10. Tubing
11. Inner wall
12. Outer wall
14. Top wall
15. Plug
20. Liquid level control device
21. First flow controller
22. Second flow controller
31. Casing
32. First vent
33. First valve
34. Inlet
36. Outlet
37. Valve closure
38. Valve stem
39. First float
41. Pivot pin
42. Mounting block
43. Projections
44. Water supply
46. Outlet tube
47. Bottom plate
48. Apertures
49. Breather tube
50. Foot
51. Bottom
52. Breather hole
53. First chamber
61. Casing
62. Second vent
63. Second valve
64. Inlet
66. Outlet
67. Valve closure
68. Valve stem
69. Second float
71. Pivot pin
72. Mounting block
73. Projections
77. Bottom plate
78. Apertures
79. Breather hole
80. Foot
83. Second chamber
86. Weights
89. Tube
91. First liquid level line
92. Second liquid level line
93. Third liquid level line
94. Fourth liquid level line
95. Fifth liquid level line
96. Sixth liquid level line
101. One side
102. Other side
120. Tap
121. Backflow preventer valve
122. Snap-on coupling
123. Pressure regulator
124. Low pressure flexible tubing
126. Fertiliser dispenser
127. Filter
128. Low pressure flexible tubing
129. T-pieces
131. Saucers
132. Plant containers
133. Plants
134. Wicking portions
136. Water and fertiliser
137. Siphon tubes
138. Soil or potting medium
141. Plant container
142. Trough
143. Ridge
144. Bottom
146. Feet
147. Lid
148. Plant pots
149. Wicking extensions
151. Cover

DETAILED DESCRIPTION WITH RESPECT TO THE DRAWINGS

The liquid level control device 20 shown in the drawings comprises a first float flow controller 21 and a second controller 22.

The two flow controllers are substantially, but not entirely, identical.

The first flow controller 21 comprises an outer casing 31 having a vent 32, a valve 33 comprised of an inlet 34, an outlet 36, a valve closure 37 and a valve stem 38.

Within the casing 31 is a float 39 which is pivotally mounted via a pivot pin 41 to a mounting block 42 which is located in the casing 31 by projections 43. Note also the existence of projections 73 which are not used in the first controller.

The mounting block 42 is a sliding fit on the projections 43.

The arrangement of the first valve 33 is such that, when the float 39 is in a down position, the valve closure 37 will open the valve 33 and, when the float 39 is in an up position, the valve 33 will be closed.

A low pressure water supply desirably regulated to 10–15 psig as described in Australian Patent Specification No. PL4162/92 indicated by tube 44 is connected to the inlet 34 and an outlet tube 46 is connected to the outlet 36. The outlet tube 46 desirably terminates as close as reasonably possible to the bottom of the first controller so as to be under water most of the time to guard against leakage of air into the first controller.

The casing 31 has a bottom plate 47 provided with apertures 48.

The plate 47 has a foot 50 to stop the apertures 48 from being blocked. The foot 50 is desirably as low as reasonably possible and a height of not more than 5 mm, preferably 3 mm or less is suggested.

The casing 31 also has a breather tube 49 which is open at its bottom 51 and at its top via a breather hole 52 to a chamber 53 within the casing 31. The breather tube 49 desirably terminates as close as reasonably possible to the bottom of the first controller and a height of not more than 5 mm, preferably 3 mm or less, more preferably 2 mm or less is suggested.

The second flow controller 22 is substantially, but not entirely identical, to the first flow controller 21.

The second flow controller 22 comprises a casing 61, a second vent 62, a second valve 63, an inlet 64, an outlet 66, a valve closure 67, a valve stem 68, a second float 69, a pivot pin 71, a mounting block 72, projections 43, projections 73, a bottom plate 77, apertures 78, a foot 80, and a second chamber 83. The mounting block 72 is a sliding fit on the projections 73.

It is to be observed that the mounting block 72 and projections 73 are differently located to the mounting block 42 and projections 43 such that, when the second float 69 is in a down position the second valve 63 is closed and, when the second float 69 is in an up position, the second valve 63 is open. However, by having projections 43 and 73 the casings 31 and 61 can be identical and need only be assembled differently.

The second float 69 is weighted by weights 86.

The second flow controller 22 also includes a breather tube 79 but in the second flow controller 22 that breather tube 79 performs no useful function.

A tube 89 connects the first vent 32 to the inlet 64.

In use, the liquid level control device is located in a vessel which will probably contain plants in pots to be watered by the liquid level control device.

The manner of operation of the liquid level control device will now be explained with reference to FIGS. 3–7 commencing from a condition in which the vessel contains no water at all.

The controllers 21 and 22 are shown separated in FIGS. 3–6 for convenience of depiction.

Figure 3:
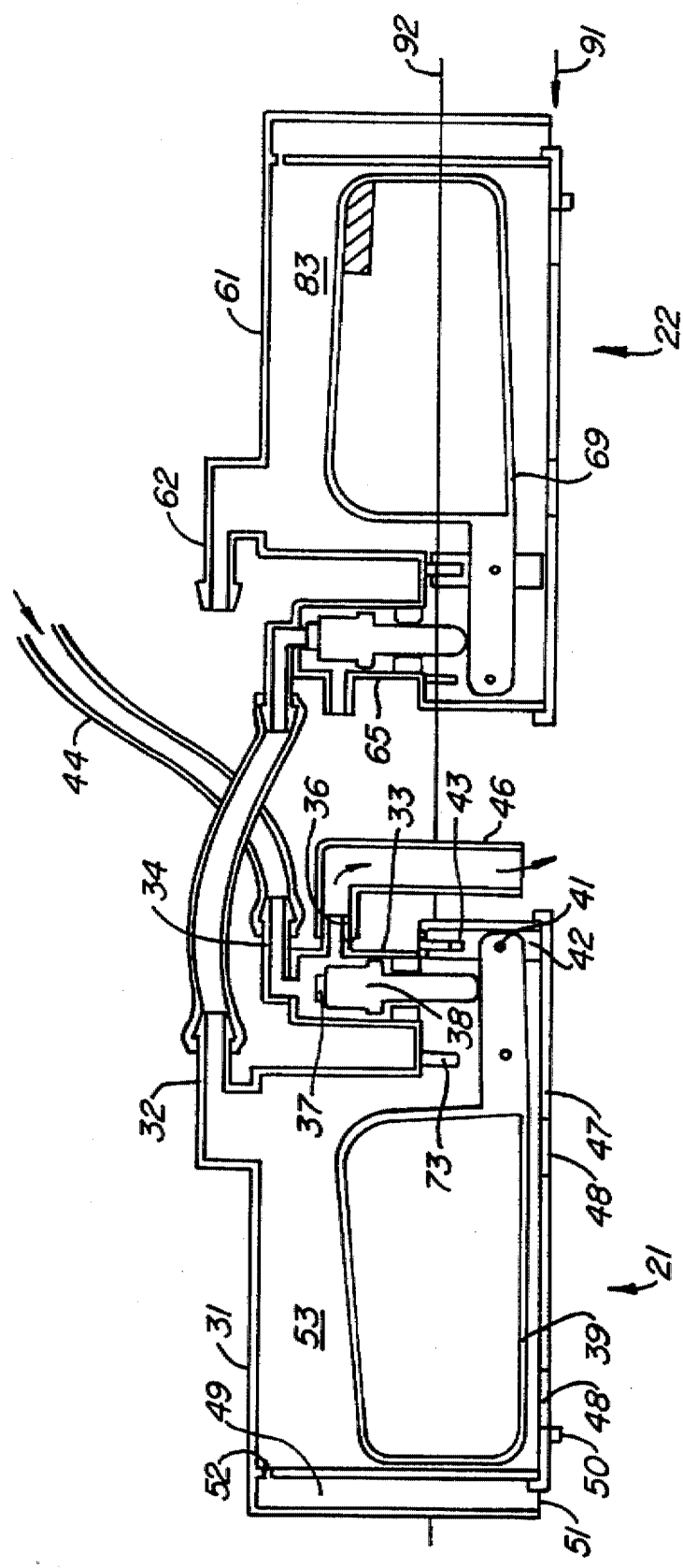
FIG. 3 is a cross-sectional view of the device in accordance with this invention in one condition.
Figure 4:
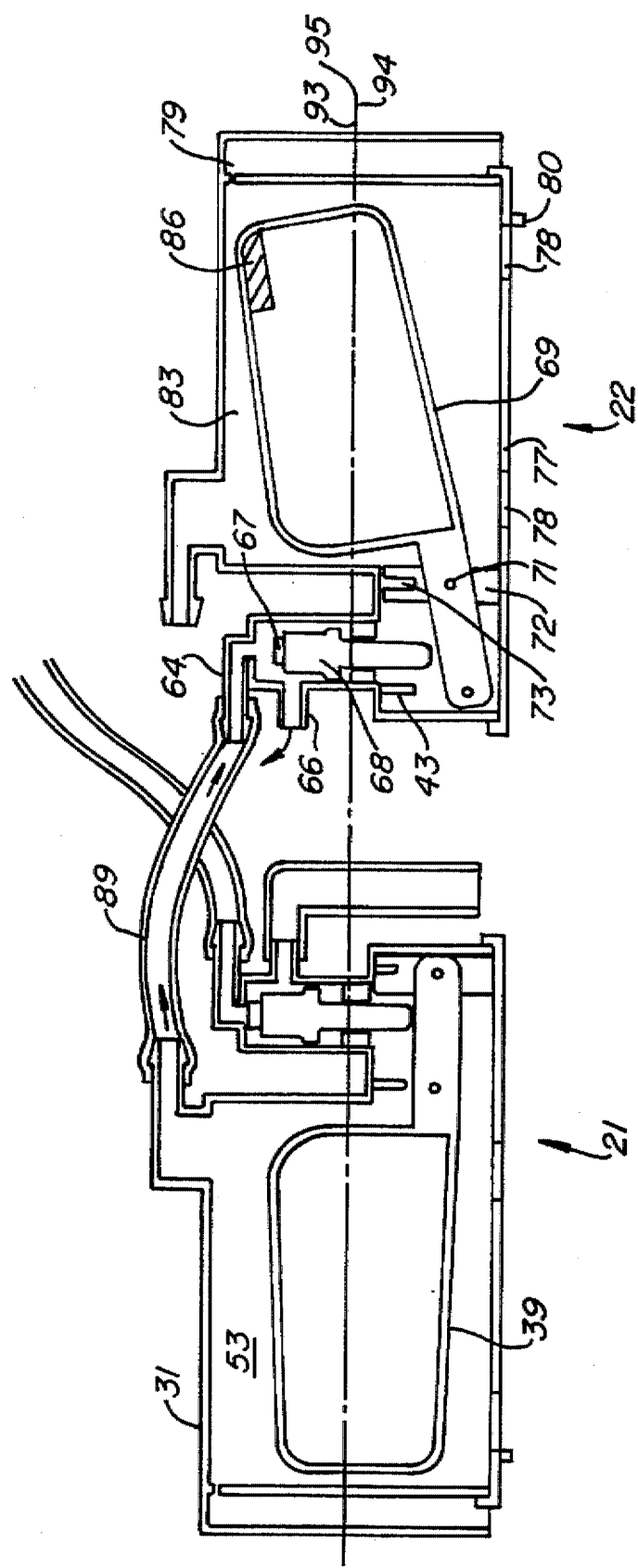
FIG. 4 is a cross-sectional view of the device in accordance with this invention in another condition.
Figure 5:
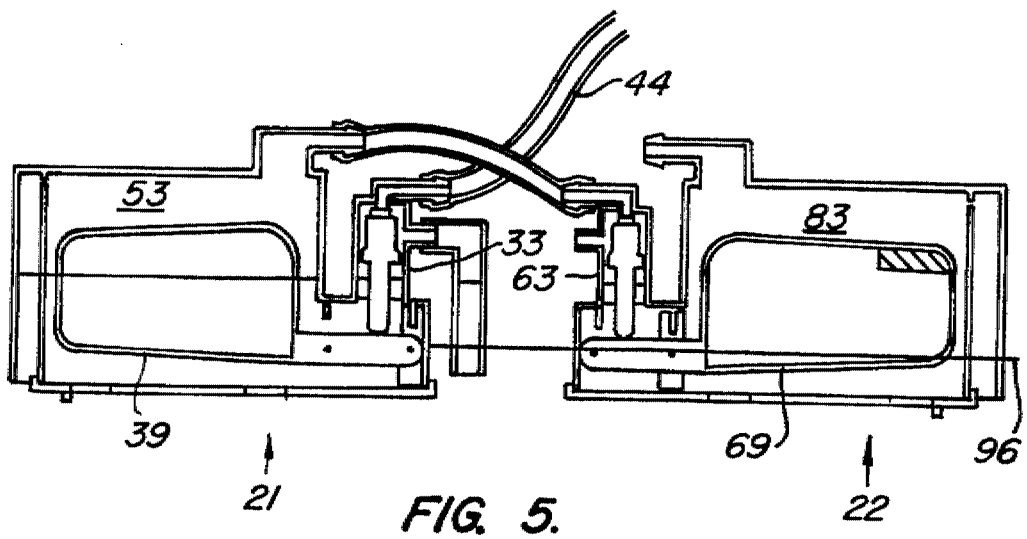
FIG. 5 is a cross-sectional view of the device in accordance with the invention in another condition.
Figure 6:
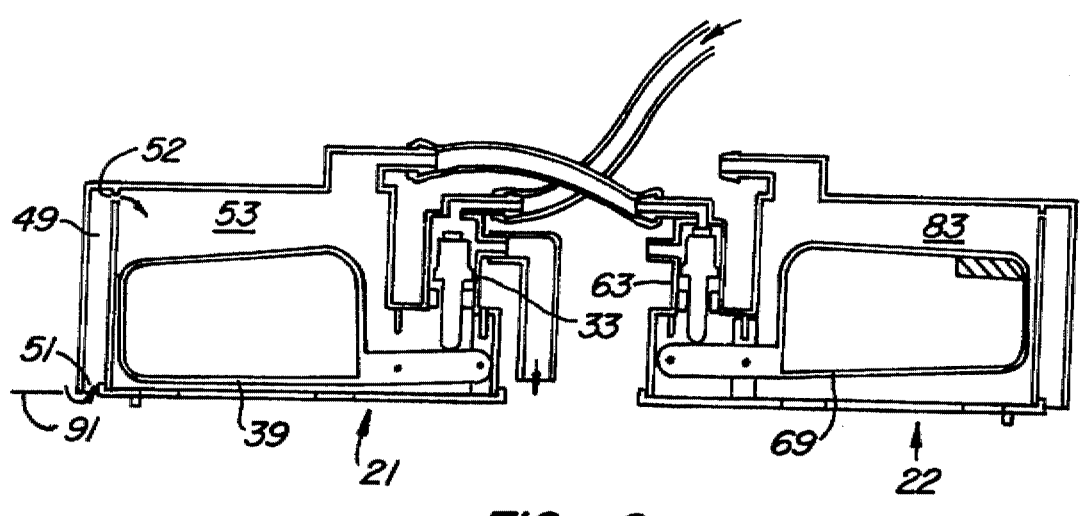
FIG. 6 is a cross-sectional view of the device in accordance with this invention in another condition.

Water is supplied to the liquid level control device via the water supply 44 and at commencement the first float 39 and the second float 69 will both be in a down position and the level of water will be below a first predetermined level indicated by line 91 in FIG. 3.

In consequence of the first float 39 being down, the first valve 33 will be open and water will flow via the water supply 44 and outlet tube 46 into the vessel.

Water will enter the chamber 53 via the apertures 48 and, after a delay period due to the weight of the first float 39, will commence to raise the float 39.

However, as the second float 69 is down the second valve 63 will be closed and air will not be able to escape via the first vent 32 and in consequence air pressure within the first chamber 53 will prevent water from entering the first chamber 53 other than to the limited extent which can occur due to the compressing of the air within the first chamber 53.

Thus, notwithstanding that the water level in the vessel itself will rise, the water level in the first chamber 53 will rise by only a little.

As the vessel commences to fill, water will also flow via the aperture 78 into the second chamber 83 and as the second vent 62 is not closed air can escape and the water level in the second chamber 83 can rise.

Since the second float 69 is weighted by the weights 86, the level in the second chamber 83 will need to rise to a substantial level indicated by line 92 before the second float 69 will commence to rise and when the second float 69 rises sufficiently, the second valve 63 will open and this will allow air to flow via the first vent 32 and tube 89 to the inlet 64 and thence to the outlet 66.

When the first chamber 53 so vents, water can flow into the apertures 48 and will cause the water level in the first chamber 53 to rise to the third liquid level line 93.

In consequence, the first float 39 will rise and will close the first valve 33 so shutting off water supply via the water supply 44 and the vessel will be full to about the fourth liquid level line 94.

As a plant in a container consumes water from the vessel such as by a wicking effect, the water level in the vessel will slowly drop and, at a fifth liquid level line indicated by 95, the second float 69 will have fallen to a level at which the second valve 63 is closed.

In consequence, air will not flow through the first vent 62 into the chamber 53 and as the liquid level in the vessel drops still further a partial vacuum will occur in the first chamber 53 which will maintain the liquid level therein at approximately the level of the fifth liquid level line 95 although due to the fact that a partial vacuum occurs the liquid level in the first chamber 53 will drop slightly below the fifth liquid level line 95.

As a result, the first float 39 will remain in an up position in which the first valve 33 is kept closed.

Ultimately, the water level in the vessel will drop to about the first liquid level line 91 in consequence of water being consumed by the plant and when that occurs the bottom 51 of the breather tube 49 will become exposed and air can pass into that bottom 51, through the breather tube 49 and through the breather hole 52 into the first chamber 53 so breaking the partial vacuum in the first chamber 53 which will allow water to flow out of the first chamber 53 via the apertures 48 so that the liquid level in the first chamber 53 falls to about the level of the first liquid level line 91 and in consequence the first float 39 will fall which will open the first valve 33 and allow the cycle to recommence.

In practical terms, the third liquid level line 93, fourth liquid level line 94 and fifth liquid level line 95 have been indicated as being different and this is so because the mechanisms would not be perfect mechanisms and there would be some hysteresis in opening and closing of valves.

However, if there were perfect mechanisms and no hysteresis, then the levels 93, 94 and 95 would be the same.

It is also to be noted that the first valve 33 will commence to open when the first float 39 has fallen due to the water in the chamber 53 reaching a sixth liquid level line 96 which is a line at which the first valve would normally open, and, in the absence of a hysteresis and assuming perfect mechanisms, and the absence of the second flow controller 22, would also close.

Figure 7:
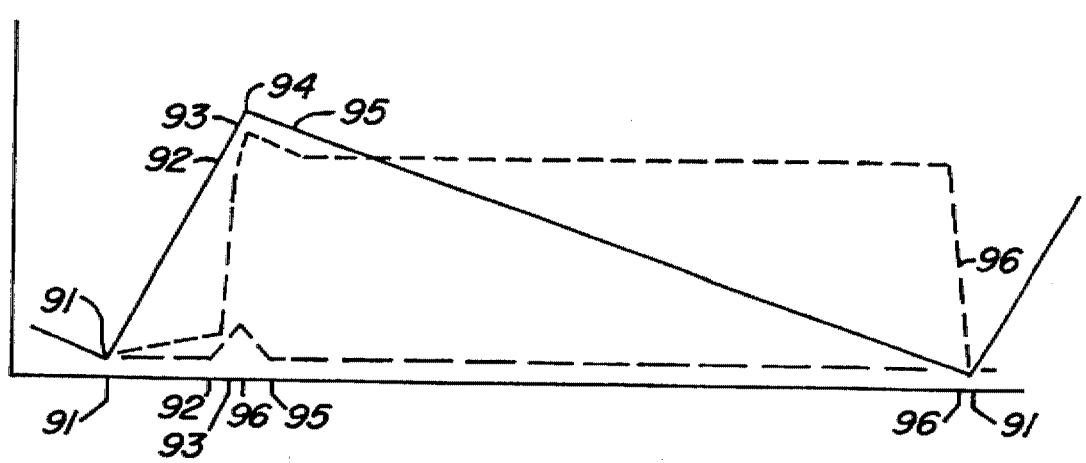
FIG. 7 is a schematic graph representing the operation of the device.

The various water levels and the times at which they occur are represented in FIG. 7 which is a somewhat schematic graph. In FIG. 7, the solid line represents the height of water in the vessel, the short dash line represents the height of a point on the first float 39 and the long dash line represents the height of a point on the second float 69. Those points were selected to make the graph clear and do not directly represent the height of the float or water levels in the chambers.

Dependant on water pressure and the volume of the vessel, the time between levels 91 and 94, the filling of the vessel time is likely to be not more than 5 minutes. The time between levels 92 and 93 is likely to be only a few seconds. The time between levels 93 and 94 is likely to be only about one second.

The time between level 94 and the return to level 91 will depend on weather conditions and the rate of consumption of water by a plant but is likely to be from 4 hours to 7 days.

Applicant presently prefers that the difference in height between level 91 and level 94 is about 20–40 mm with about 30 mm being most preferred.

The level at which the second valve 63 will open can be varied by adjusting the amount of the weights 86.

However, it is preferred that the casings 31 and 61 have, on one side, projections and on the other side 102 have recesses. By selecting which projection is located in which recess, the height of the casings 31 and 61 with respect to one another can be varied and this offers an alternative or additional method of setting the levels at which the first valve 33 and the second valve 63 will open.

The above described liquid level control device has been found to be most useful in the watering of plants in that it tends to water plants on demand rather that merely maintaining a particular level of water.

As described above, the first flow controller 21 and second flow controller 22 are both disposed within the same vessel. However, there is no reason why the first flow controller 21 should not be placed in a first vessel and the second flow controller 22 placed in a second vessel provided that there is a fluid connection between the two vessels.

The fluid connection may be an overflow from one vessel to the other or maybe a connection which equalises the water levels in the two vessels.

If desired, the outlet tube 46 may be taken to the top of a plant container to water a plant from the top.

The outlet tube 46 may extend upwards and may be fitted with a sprinkler. If this is done it is desirable that the valve stem 38 is provided with O-rings or other means of sealing or be a sufficiently close fit so that there is little leakage and pressure at the sprinkler may be maintained.

Liquid level control devices in accordance with this invention have the material advantage of watering a plant in a fairly natural way. That is, the plant can consume water at its own rate but will not have additional water supplied until it has consumed a previous supply of water.

The liquid level control device of the present invention has many applications in plant watering.

In particular, it has application in wicking systems and in feeding a capillary mat on which plants can be grown in containers.

It may be used in high pressure systems but it is best in low pressure systems.

If desired, a fertiliser dispenser may be included and reference is made to co-pending Australian Patent Application No. PL4162/92 and the whole of the subject matter thereof is to be considered as imported hereinto.

In one arrangement a water jacket is provided within which a plant in a container may be located and the control device of the invention is used to control flow from the water jacket to the container.

Various applications of the liquid level control device in accordance with this invention will now be described to exemplify some of its use.

Figure 8:
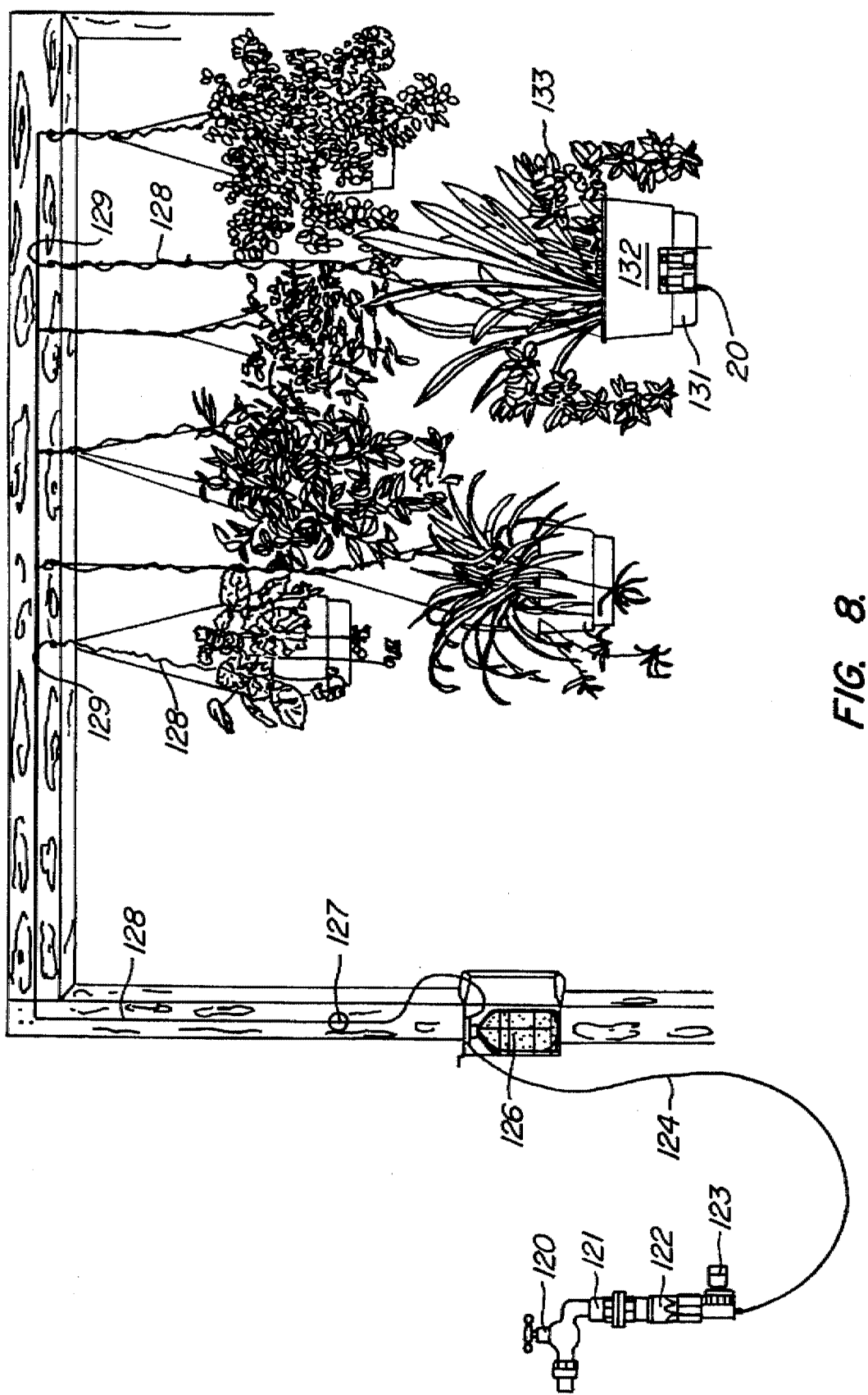
FIG. 8 is a schematic representation of a watering system utilising the liquid level control device.

Reference is made to FIG. 8 which shows a garden watering system comprising a mains pressure tap 120, a backflow preventer valve 121, a snap-on coupling 122 and a pressure regulator 123.

The function of the pressure regulator 123 is to maintain water pressure downstream of it at a constant 10–15 psig.

The pressure regulator 123 is connected by low pressure flexible tubing 124 to a fertiliser dispenser 126.

The fertiliser dispenser 126 is more fully described in applicants co-pending application Ser. No. PL4162/92.

Water with added fertiliser passes from the fertiliser dispenser 126 via a filter 127 to low pressure flexible tubing 128 and T-pieces 129 to liquid level control devices 20 located within saucers 131 of plant containers 132 which contain plants 133.

It is to be noted that many of the plants 133 are at different levels as shown in FIG. 8 but this has no effect on the liquid level control device 20.

Figure 9:
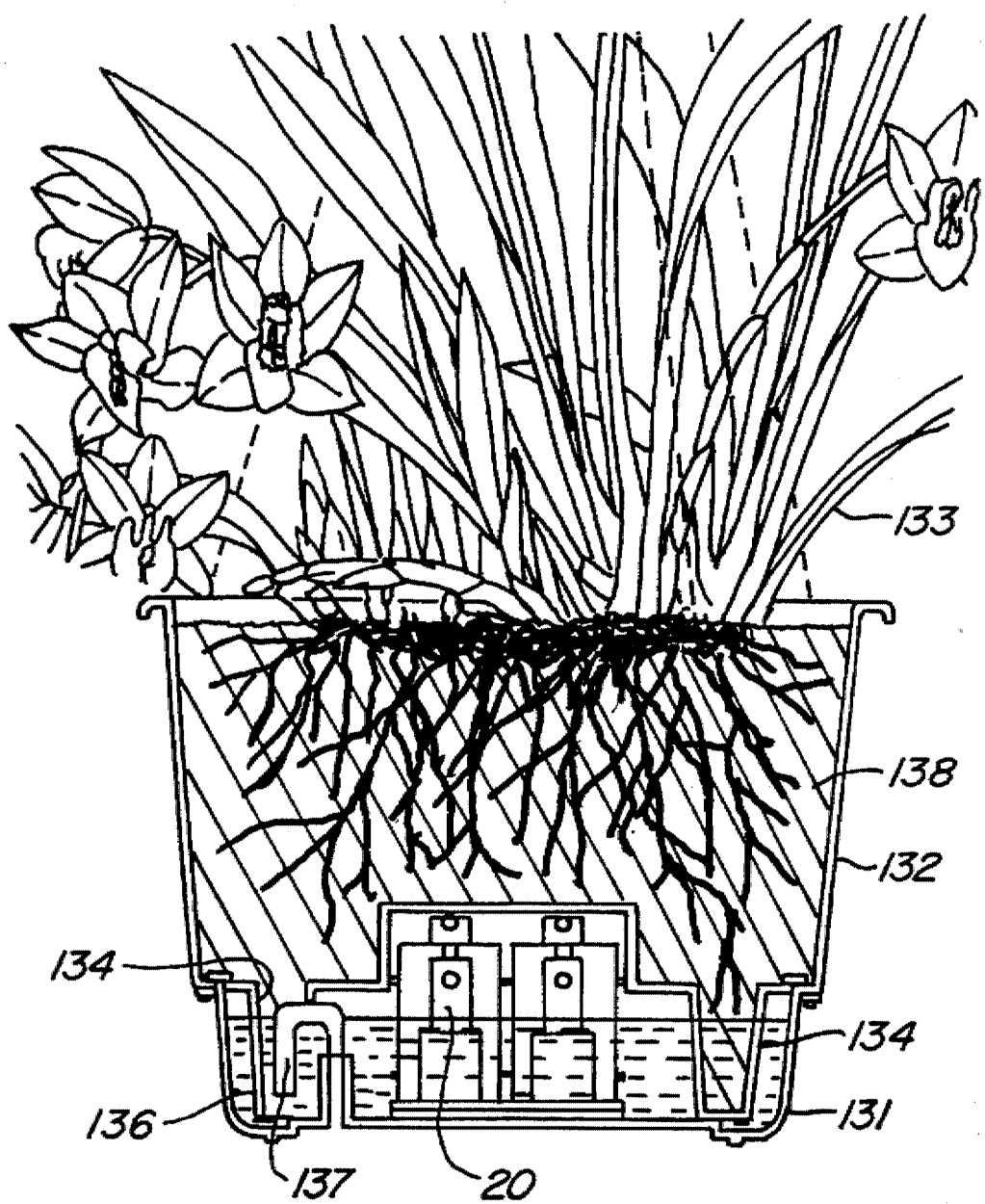
FIG. 9 is a cross-sectional view of a plant container utilising the liquid level control device.

A more detailed view of the plant containers 132 and saucers 131 is shown in cross-section in FIG. 9.

As shown in FIG. 9, the liquid level control device 20 sits in the saucer and the plant container 132 has wicking portions 134 which extend into water plus fertiliser 136.

A siphon tube 137 is provided to drain the saucers 131 if they should become overfilled due to excess rain.

It is to be noted that the wicking portions 134 represent a minor proportion of the volume of the plant container 132 and thus a majority of the soil or potting medium 138 is not immersed in water and fertilised 136.

The low pressure flexible tubing 128 is not shown in FIG. 9 but is arranged as described previously.

Figure 10:
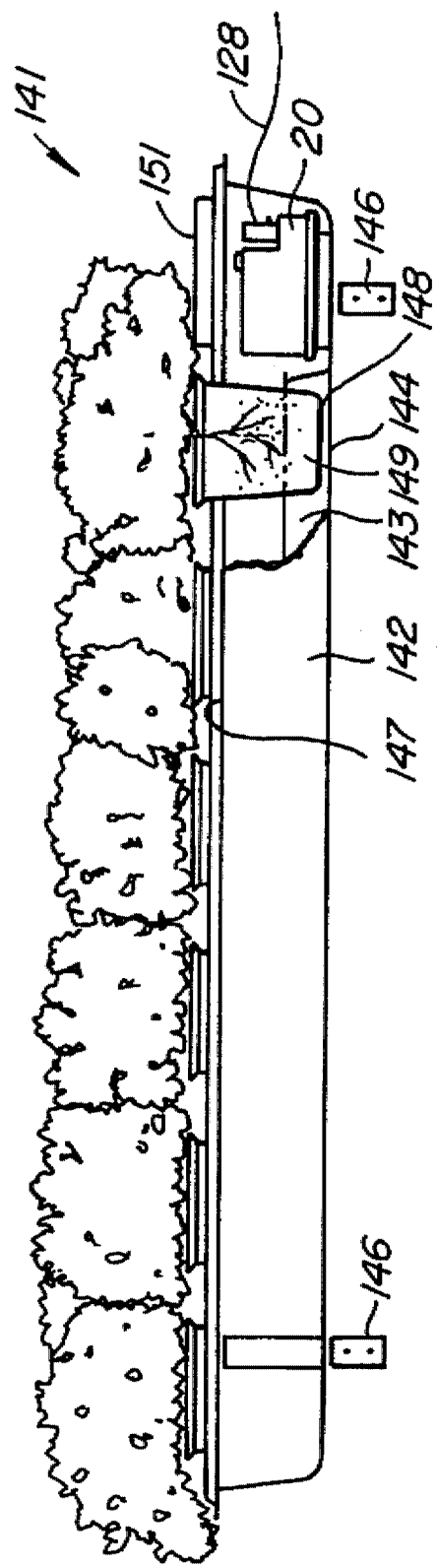
FIG. 10 is a partly broken away view of a plant container utilising the liquid level control device.

Reference is now made to FIG. 10 which shows a plant container 141 which comprises a trough 142 having a central ridge 143 projecting up from its bottom 144 to reduce the volume of the trough 142. At one end is located one of the liquid level control devices of the invention 20.

Feet 146 are provided for supporting the trough.

A lid 147 extends along the length of the trough 142 and has holes in it in which are located plant pots 148.

The plant pots 148 are shaped to bridge the ridge 143 and hence have wicking extensions 149.

The plant container 141 works similarly to previously described plant containers but does have the particular advantage that any one of the plant pots 148 may be removed when desired and brought in to a house for decorative purposes. When the plant pot 148 which has been brought in to a house for decorative purposes begins to lose its quality then it may be readily replaced in the plant container 141 which should rejuvenate it.

Further, applicant has found that the plant container 141 is excellent for growing herbs and smaller vegetables such as spring onions, shallots and some varieties of lettuce.

The plant container 141 can also be used as a window box either inside or outside a house or other building.

A cover 151 is provided in the region in which the liquid level control device 20 is located.

Applicant has also addressed the problem of indoor landscape gardening as is commonly done in houses and in offices. Indoor plants are often sorely neglected and while gardeners may be employed to water indoor plants a significant expense is involved in that most indoor plants need to be watered at least once a week and probably more often for best effect but there is a tendency to water indoor plants infrequently but when they are watered to seriously overwater them.

The liquid level control device of the present invention in considered to be excellent for watering indoor plants.

Applicant, however, considers that there is a measure of danger in providing a continuous supply of water to one of the liquid level control devices 20 as if there were any damage to the low pressure flexible tubing 128 or disconnection of connectors such as T-pieces 129 then flooding could result with damaged carpet and other materials.

Figure 11:
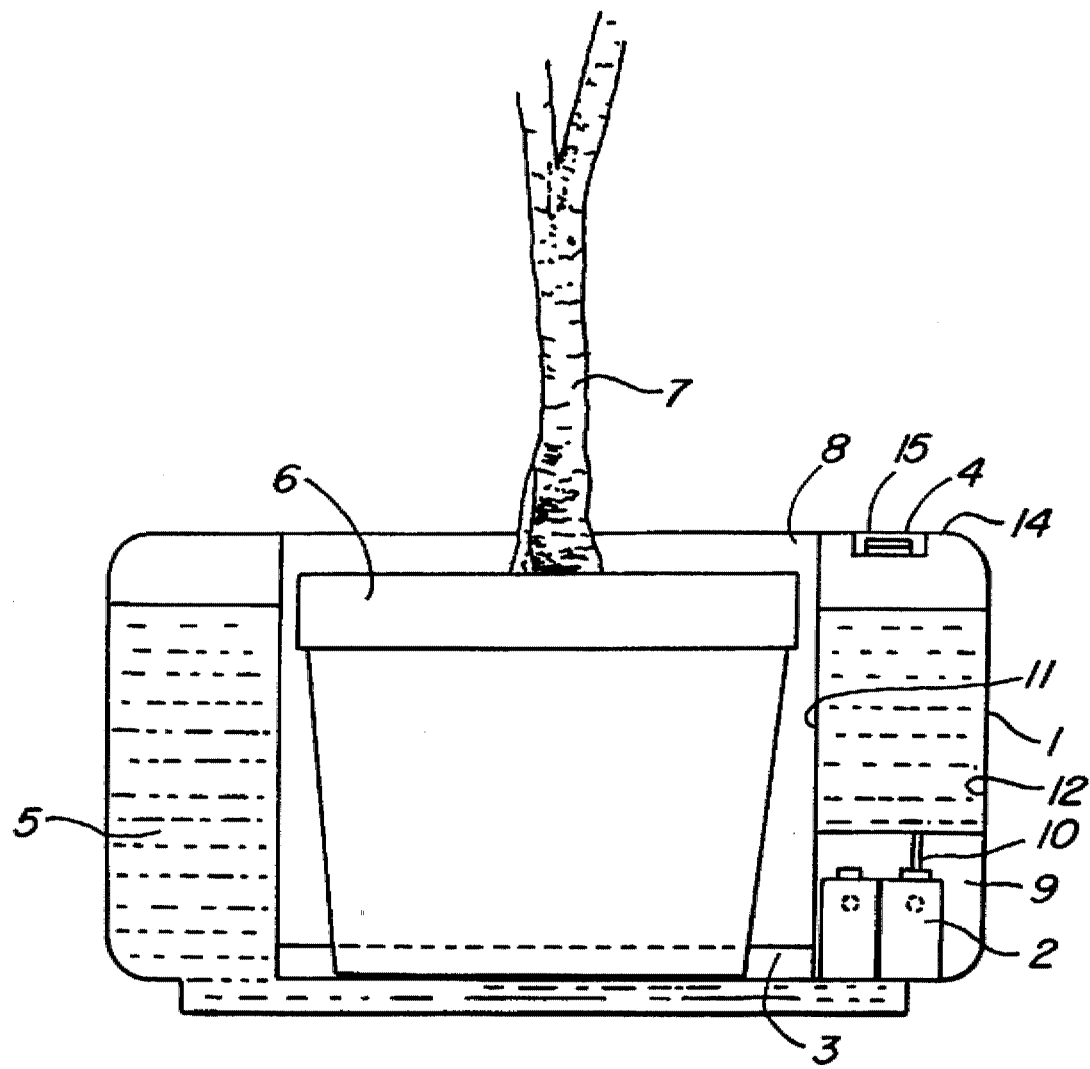
FIG. 11 is a cross-sectional view of another plant container utilising the liquid level control device.

With a view to providing a watering system for indoor plants applicant proposes the construction shown in FIG. 11 which shows a twin wall container 1 having an inner wall 11 and an outer wall 12.

The outer wall 12 is continuous and water tight.

Between the inner wall 11 and outer wall 12 there is effectively a reservoir 5 which can contain water.

A top wall 14 is provided over that reservoir region and a plug 15 over a filling hole 4 is provided for filling the reservoir 5 when needed.

The inner wall 11 has a recess 9 within which is located a liquid level control device 2 in accordance with this invention.

The liquid level control device 2 is connected to the reservoir 5 by tubing and suitable connectors (not shown). This is the only connection between the reservoir 5 and the interior defined by the inner wall 11.

That interior is a cavity 8 in which a plant 7 located in a standard garden pot 6 may be located.

The liquid level control device 2 will operate as previously described and will allow water into the cavity 8 as previously described to a maximum water level indicated by 3.

The reservoir 5 can be easily sized to provide four or more weeks water requirement for the plant 7.

In the event that there were any failure in the tubing 10 or connectors or in the liquid level control device 2 then the very worse that can happen is that the water in the reservoir 5 will drain into the cavity 8. While that may be disastrous for the plant 7, it would not cause any damage external of the twin wall container 1.

Further, when it is desired to replace the plant 7, it is an easy matter to lift the standard pot 6 out of the cavity 8 and to replace it with another pot containing another plant.

It is believed that the twin wall container 1 should materially prolong the life of indoor plants in that they will get good quality watering but there will be less need to service as the water supply should last a substantial time.

ADDITIONAL OPTIONAL FEATURES

It is preferred that the first vent and the inlet to the second valve are spigots and/or sockets and/or sleeves so that they may be coupled by tubing such as flexible plastic tubing.

In general, all necessary connections may be made with flexible plastic tubing.

The first flow controller and the second flow controller may be located side by side, joined to one another, be integrally formed with one another or be spaced apart.

Each of the above configurations has individual uses.

The first flow controller and second flow controller may be spaced apart if the shape or size of a particular plant container suits or requires this or if it is desired to place one flow controller in one vessel and the other in another vessel.

The side by side and joined is desirable for compactness and a height difference between them can be used to set a maximum water level.

A construction in which the two chambers are integrally formed with one another gives compactness and some economies in manufacture and handling but reduces versatility.

Bottom walls of the first chamber and the second chamber are preferably flat and have apertures therein but spacer means is preferably provided to space the apertures above the bottom of a vessel. A spacing of 2–5 mm preferably 3–4 mm is desirable to avoid surface tension problems.

Such bottom walls are preferably separate integers from the side walls and top walls for reason of ease of assembly and for servicing but the bottom walls may be bonded to the side walls after assembly.

Applicant prefers the maximum depth of water above the bottom of a vessel in which the liquid level control device is located to be about 25–35 mm, preferably 30 mm, but this can be adjusted to be more or less by appropriate height of location of the device, height of the two controllers relative to one another and by adjustment of weights on the second.

The devices of the present invention can be free-standing and can be readily moved from vessel to vessel at replanting time or when desired.

The claims and drawings form part of the disclosure of this specification.

Finally it is to be understood that various alterations, modifications and/or additions may be incorporated into the various constructions and arrangements or parts without departing from the spirit and ambit of the invention.

We claim:

1. A liquid level control device for controlling the level of water from a water supply, the liquid level control device adapted to be located in a vessel for holding water, the liquid level control device comprising:

a first flow controller comprising a first float located in a first chamber moveable between an up position and a down position responsive to a level of water in the first chamber, the first chamber being open at its bottom to allow water ingress and egress and having a first vent to allow egress of air, and a first valve communicated to the water supply, the first valve being operatively connected with the first float such that when the first float is at the down position when the level of water in the first chamber is at or below a first predetermined level of water, the first valve opens to allow water into the vessel and into the first chamber to tend to raise the first float and to displace air in the first chamber via the first vent, and when the first float is at the up position when the level of water in the first chamber is at or above a second predetermined level of water the first valve closes to prevent further water flow into the vessel;

a second flow controller comprising a second float communicated to the vessel and moveable between an up position and a down position responsive to a level of water, and a second valve being operatively connected with the second float and being connected to the first vent such that when the second float rises, in consequence of the first valve allowing water into the vessel, the second valve opens to allow air to flow from the first chamber via the first vent and the second valve to escape to atmosphere, and the second valve being operatively connected to the second float so that when the level of water in the vessel drops to a third predetermined level of water in consequence of water in the vessel being used or being removed, the second float falls to a level of water to close the second valve, before the first float has fallen to a level of water to open the first valve, to thereby prevent air flow via the first vent into the first chamber to establish, as the level of water in the vessel falls still further, a partial vacuum in the first chamber which maintains the level of water therein at a level of water such that the first float will not fall to a level of water to open the first valve; and a breather for the first chamber located with an opening such that, when the level of water in the vessel falls to below a fourth predetermined level of water in consequence of water in the vessel being used or being removed air enters through the breather into the first chamber to overcome the partial vacuum to allow water to flow out of the first chamber to allow the first float to fall to a level of water to open the first valve to commence allowing water into the vessel.

2. A liquid level control device as claimed in claim 1, wherein the second float is located in a second chamber.

3. A liquid level control device as claimed in claim 2, wherein the second chamber is substantially identical to the first chamber.

4. A liquid level control device as claimed in claim 3, wherein the first chamber and the second chamber have mounting means adapting them to be mounted together as a unit.

5. A liquid level control device as claimed in claim 4, wherein the mounting means is such that the first chamber and the second chamber may be mounted together as a unit with one of the first chamber and the second chamber being located at a selected height with respect to the other of the first chamber and the second chamber.

6. A liquid level control device as claimed in claim 2, wherein the first chamber and the second chamber are each defined by a casing having a side wall, a top wall and a bottom wall.

7. A liquid level control device as claimed in claim 1, wherein the breather comprises a tube extending from adjacent the bottom of the first chamber to adjacent the top of the first chamber and opening to the first chamber adjacent the top of the first chamber.

8. A liquid level control device for controlling water level in a vessel, the liquid level control device comprising:

a first flow controller, and a second flow controller;

each flow controller comprising a casing having a top, a bottom, and a vent at or adjacent the top of the casing;

an opening adjacent the bottom of the casing, a valve having an inlet and an outlet, a float moveable between an up position and a down position, and a fulcrum on which the float can move to control the valve;

the first flow controller having the fulcrum located such that in down and up positions of the float, the valve thereof is respectively opened and closed;

the second flow controller having the fulcrum located such that in down and up positions of the float the valve thereof is respectively closed and open;

wherein the casing of each flow controller are adapted to be joined together as a unit and optionally at a selected height with respect to one another;

the casing of the first flow controller having a breather adjacent to the bottom of the casing;

the vent of the first flow controller connected to the inlet of the valve of the second flow controller, the inlet of the valve of the first flow controller connected to a water supply; and the vent of the second flow controller being open and with the device in a vessel;

wherein, when water initially commences to flow it will flow into the vessel from the outlet of the valve of the first flow controller to raise the float of the second flow controller to open the valve thereof to allow air to flow from the casing of the first flow controller to allow the float thereof to rise to close the valve thereof to stop water flow;

and when the water level in the vessel falls the float of the second flow controller will fall to close the valve thereof to hold water in the casing of the first flow controller to prevent the float thereof from falling to the down position;

and, when the water level in the vessel falls to a level to uncover the bottom of the breather, to allow air to flow via the breather into the casing of the first flow controller to allow the float thereof to fall to the down position, flow recommences into the vessel.

9. A liquid level control device as claimed in claim 8, wherein the breather comprises a tube extending from adjacent the bottom of the casing and opening to the interior of the casing adjacent to the top of the casing.

10. A liquid level control device as claimed in claim 8, wherein the outlet of the valve of the first flow controller is located below, in use, the mean water level maintained in the vessel.

\* \* \* \* \*